(12) United States Patent
Novack

(10) Patent No.: US 11,280,971 B2
(45) Date of Patent: Mar. 22, 2022

(54) OPTICAL COUPLING WITH UNDERCUT PROTECTION FROM UNDERFILL

(71) Applicant: Nokia Solutions and Networks Oy, Espoo (FI)

(72) Inventor: Ari Novack, New York, NY (US)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/988,890

(22) Filed: Aug. 10, 2020

(65) Prior Publication Data

US 2022/0043222 A1 Feb. 10, 2022

(51) Int. Cl.
    *G02B 6/42* (2006.01)
(52) U.S. Cl.
    CPC ......... *G02B 6/4239* (2013.01); *G02B 6/4204* (2013.01)
(58) Field of Classification Search
    CPC .............................. G02B 6/4239; G02B 6/4204
    USPC ............................................................. 385/38
    See application file for complete search history.

(56) References Cited

U.S. PATENT DOCUMENTS

2012/0145307 A1* 6/2012 Margolin ............. G02B 6/3885
156/72

FOREIGN PATENT DOCUMENTS

WO WO-2020077285 A1 * 4/2020 ............... G02B 6/02

* cited by examiner

Primary Examiner — Jerry M Blevins
(74) Attorney, Agent, or Firm — Stratford Group Ltd.

(57) ABSTRACT

An underfill adhesive may be used to mechanically stabilize a photonic integrated circuit chip (PIC) onto an electrical substrate; however, when the PIC is optically coupled to an external optical fiber at or near an edge of the chip, e.g. using an edge coupler, the underfill may flow into the optical interface impacting optical coupling quality. A photonic integrated circuit apparatus according to the disclosure comprises an electrical substrate, which includes a cavity underneath the edge coupler for preventing underfill material from entering the optical interface by impeding capillary action thereof.

20 Claims, 17 Drawing Sheets

OPTICAL COUPLING WITH UNDERCUT PROTECTION FROM UNDERFILL

TECHNICAL FIELD

The present disclosure relates to an optical coupling with undercut protection from underfill.

BACKGROUND

Conventional photonic integrated circuits (PICs) may be mounted on a packaging platform or main electrical substrate, such as a printed circuit board (PCB), to enable electrical connections to external components and networks, and to provide a robust protective structure.

Solder bumps may be used to provide an electrical and a mechanical interface between the PIC and the packaging platform. An underfill adhesive may also be required to mechanically stabilize the PIC on the electrical substrate.

SUMMARY

Various embodiments are constructed such the underfill adhesive does not, during fabrication or assembly, flow onto the fiber/waveguide optical interface along an edge of a PIC. At least, for that reason, the quality of such edge-coupling interfaces is not negatively impacted by the adhesive.

Accordingly, one embodiment relates to an apparatus comprising:

a photonic integrated circuit (PIC) chip, including an optical device layer and an edge coupler for coupling via a part of an edge of the PIC chip to an adjacent end face of an optical fiber;

an electrical substrate configured to support the PIC chip over a planar surface thereof; and a layer of adhesive binding the PIC chip to the planar surface of the electrical substrate;

wherein the electrical substrate includes a cavity in the planar surface under the edge coupler.

In any of the above embodiments, the first apparatus may also include that the cavity is partially filled with the adhesive and has a region under the PIC chip free of the adhesive.

In any of the above embodiments, the first apparatus may also include that at least a part of meniscus of the adhesive is inside the cavity.

In any of the above embodiments, the first apparatus may also include that the PIC chip has an outer planar surface facing the cavity, and wherein a portion of said outer planar surface adjacent the part of the edge is free of the adhesive.

In any of the above embodiments, the first apparatus may also include the optical fiber.

In any of the above embodiments, the first apparatus may also include that the cavity, at least, extends under the part of the edge of the PIC chip.

In any of the above embodiments, the first apparatus may also include that the cavity extends through the electrical substrate.

In any of the above embodiments, the first apparatus may also include that the PIC chip includes a pit in an outer major surface thereof, some of the adhesive being in the pit.

In any of the above embodiments, the first apparatus may also include that the cavity extends from an inner wall under the PIC chip to an outer edge of the electrical substrate.

In any of the above embodiments, the first apparatus may also include that the PIC chip includes a component extending to an outer surface thereof; and wherein the electrical substrate also includes an additional cavity under the component.

In any of the above embodiments, the first apparatus may also include an optical coupler configured to couple light between the component and the device layer; wherein the additional cavity is under an interface between the component and the device layer.

In any of the above embodiments, the first apparatus may also include that the component comprises a light source.

In any of the above embodiments, the first apparatus may also include that the component comprise a thermal phase tuner.

In any of the above embodiments, the first apparatus may also include that the cavity extends from an inner wall under the PIC chip to an outer wall spaced from an outer edge of the electrical substrate.

In any of the above embodiments, the first apparatus may also include that the outer wall is configured at an acute angle to a longitudinal axis of the edge coupler for aligning the optical fiber at the acute angle relative to the edge coupler.

In any of the above embodiments, the first apparatus may also include that the electrical substrate includes a fiber supporting section in between the outer wall and the outer edge of the electrical substrate.

BRIEF DESCRIPTION OF THE DRAWINGS

The invention will be illustrated in greater detail with reference to the accompanying drawings which represent examples of embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
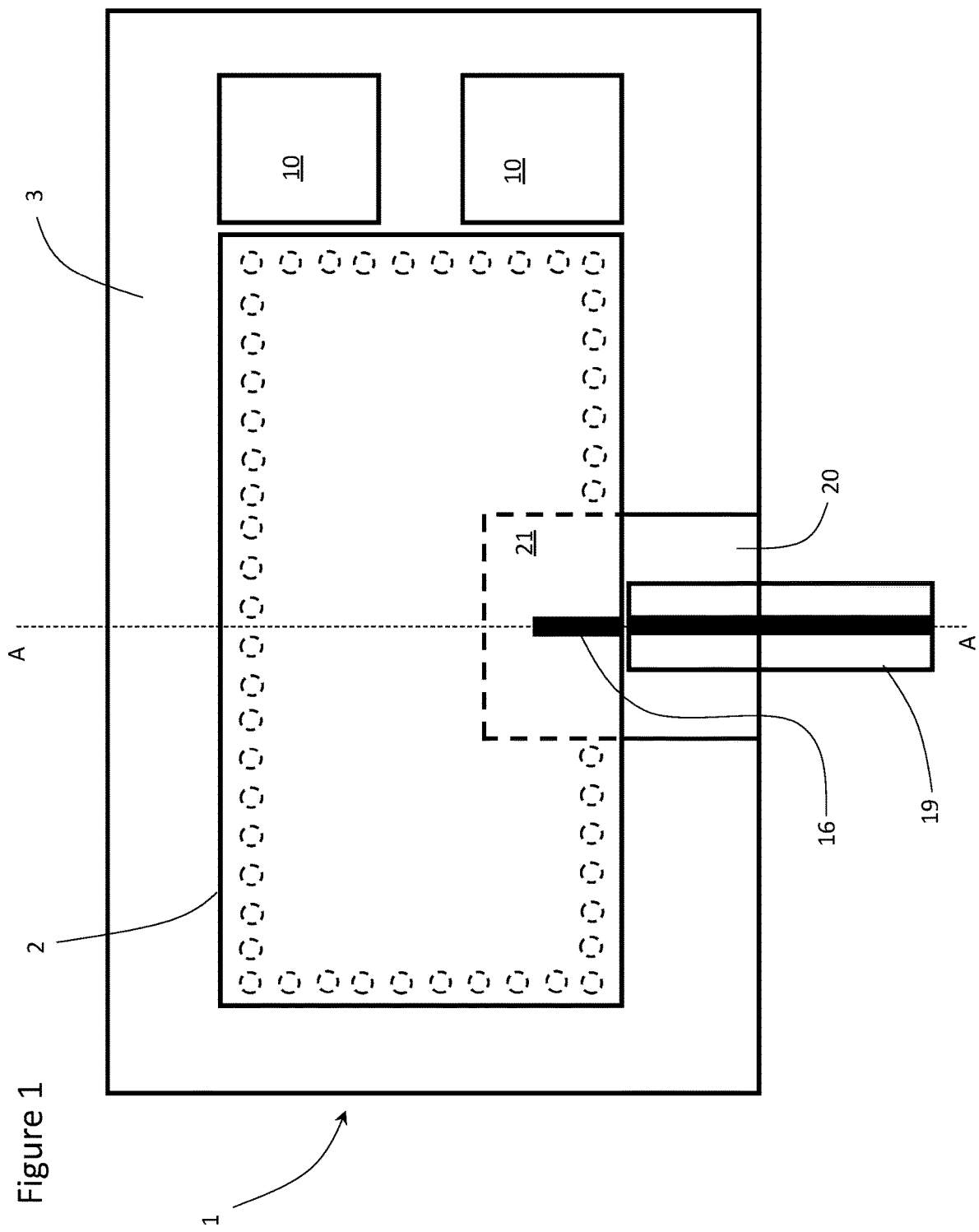
FIG. 1 is an top view of a photonic integrated circuit apparatus according to an example embodiment of the present disclosure.
Figure 2:
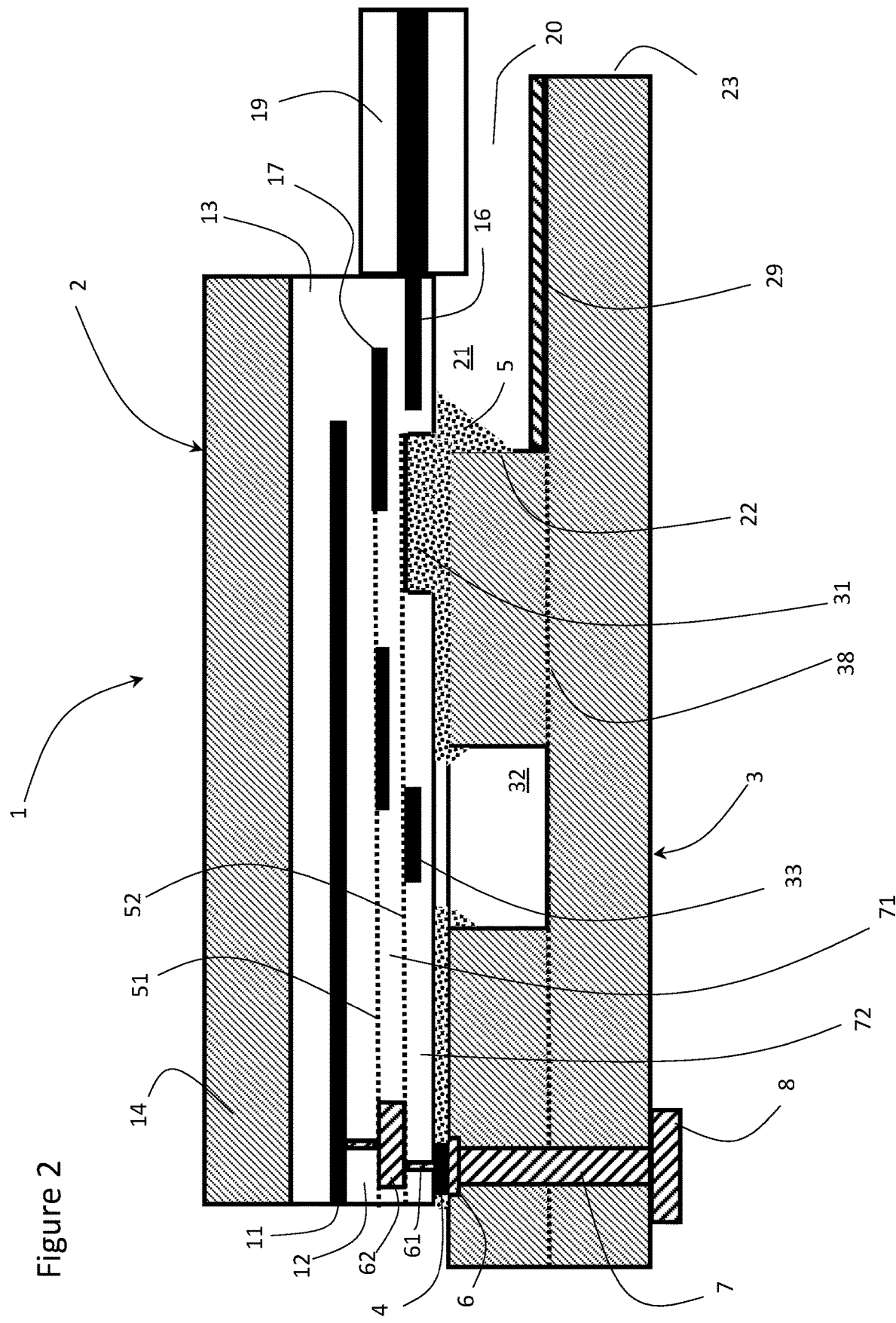
FIG. 2 is a cross-section view of the apparatus of FIG. 1.
Figure 3:
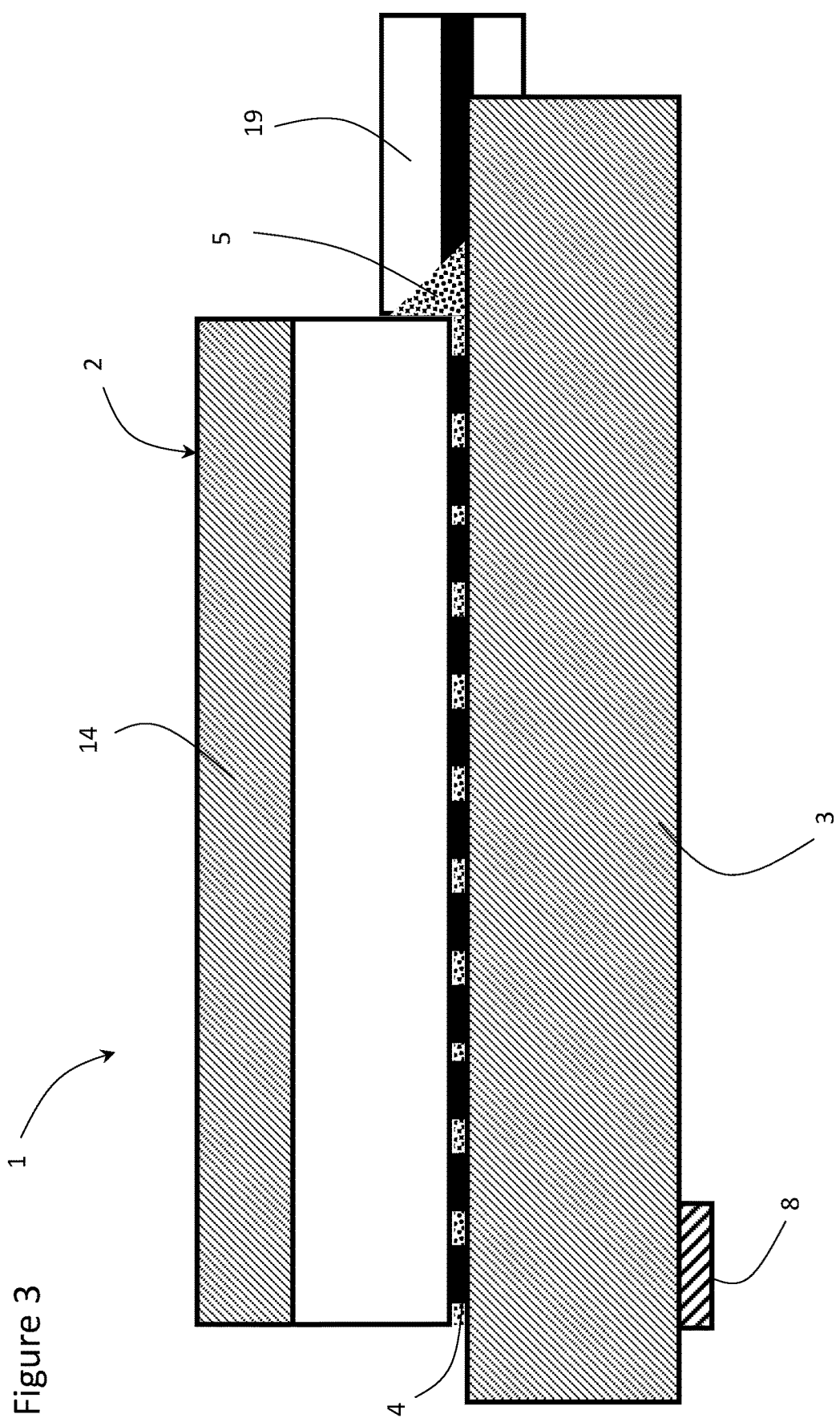
FIG. 3 is side view of the apparatus of FIG. 1.

With reference to FIGS. 1-3, an embodiment of a photonic integrated circuit apparatus 1 includes a photonic integrated circuit (PIC) chip 2 mounted on a substantially planar upper surface of a handle wafer or electrical substrate 3, which typically has a substantially large area than the PIC chip 2. Electrically conductive solder bumps 4 disposed around the periphery of the PIC chip 2 may provide an electrical connection between electro-optic components in the PIC chip 2 and opto-electrical, electrical and control devices 10 on the electrical substrate 3, e.g. one or more electrical contacts 6, conductive vias 7 and electrical leads 8 (See FIG. 2). The PIC chip 2 may include a stack of conductive vias 61 and conductive metal layers 62, e.g. Al or Cu, as part of a damascene multilayer interconnect structure for electrical connecting the electro-optic components in the PIC chip 2 to external power and control systems via the solder bumps 4. The conductive vias 61 and the conductive metal layers 62 may be defined by first and second etch stop layers 51 and 52. A layer of underfilling adhesive 5 may be provided between the PIC chip 2 and the electrical substrate 3 between and around the solder bumps 4 to bind and mechanically stabilize the PIC chip 2 on the electrical substrate 3.

The PIC chip 2 may comprise an optical device layer 11 including optical waveguide core material, e.g. silicon, and other optical components, e.g. couplers, for guiding light therein, and/or one or more electro-optical components, such as lasers, optical amplifiers, optical modulators and photodetectors, for generating, amplifying, modulating and converting the light. The optical device layer 11 may be surrounded by cladding, in particular an upper cladding layer 12 and a lower cladding layer 13 comprising a material, e.g. an oxide such as silicon dioxide, with a lower index of refraction than the optical waveguide core material in the optical device layer 11. The optical device layer 11 and the upper and lower cladding layers 12 and 13 may be mounted on a substrate 14, e.g. silicon. The entire PIC chip 2 may be comprised of a silicon on insulator (SOI) structure, as is well known in the art.

The PIC chip 2 may also comprise an optical coupler, such as an optical edge coupler 16 extending in the same layer as the optical device layer 11 or in a separate parallel layer, vertically superposed with the optical device layer 11. The edge coupler 16 may comprise segments of one or more optical waveguides, e.g. optical waveguide core(s) surrounded by cladding, extending to or proximate an edge of the PIC chip 2. In embodiments where the edge coupler 16 is not provided in the same layer as the optical device layer 11, evanescent coupling between the edge coupler 16 and the optical device layer 11 may be effected by positioning segments of the waveguide cores in the edge coupler 16 and the optical device layer 11 close enough together so that the evanescent field generated light in one waveguide core excites light in the other waveguide core. For example, the edge coupler 16 may be provided in a layer remote from the substrate 14, e.g. with the optical device layer 11 between the substrate 14 and the edge coupler 16, to prevent optical coupling from the external optical fiber 19 into the substrate 14, e.g. when the substrate 14 comprises a waveguide core material, such as silicon. To further optically isolate the edge coupler 16 from the substrate 14, a vertical coupler 17 comprising one or more optical waveguide core segments may also be provided in one or more optical waveguide core layers in between the edge coupler 16 and the optical device layer 11 for coupling light between the edge coupler 16 and the optical device layer 11. Additional cladding layer(s) 71 and 72 may be provided between each optical core layer, e.g. above the vertical coupler 17 and the edge coupler 16, respectively. One or both of the edge coupler 16 and the vertical coupler 17 may be defined by the first etch stop layer 51 and/or the second etch stop layer 52 or other additional etch stop layers found in the PIC chip 2. Alternatively, the first etch stop layer 51 or the second etch stop layer 52 may be patterned to define and etched to form the edge coupler 16 and/or the vertical coupler 17, when the first and second etch stop layers 51 and 52 comprise a waveguide core material, e.g. SiN, with an index of refraction higher than the surrounding upper cladding layer 13.

Figure 11:
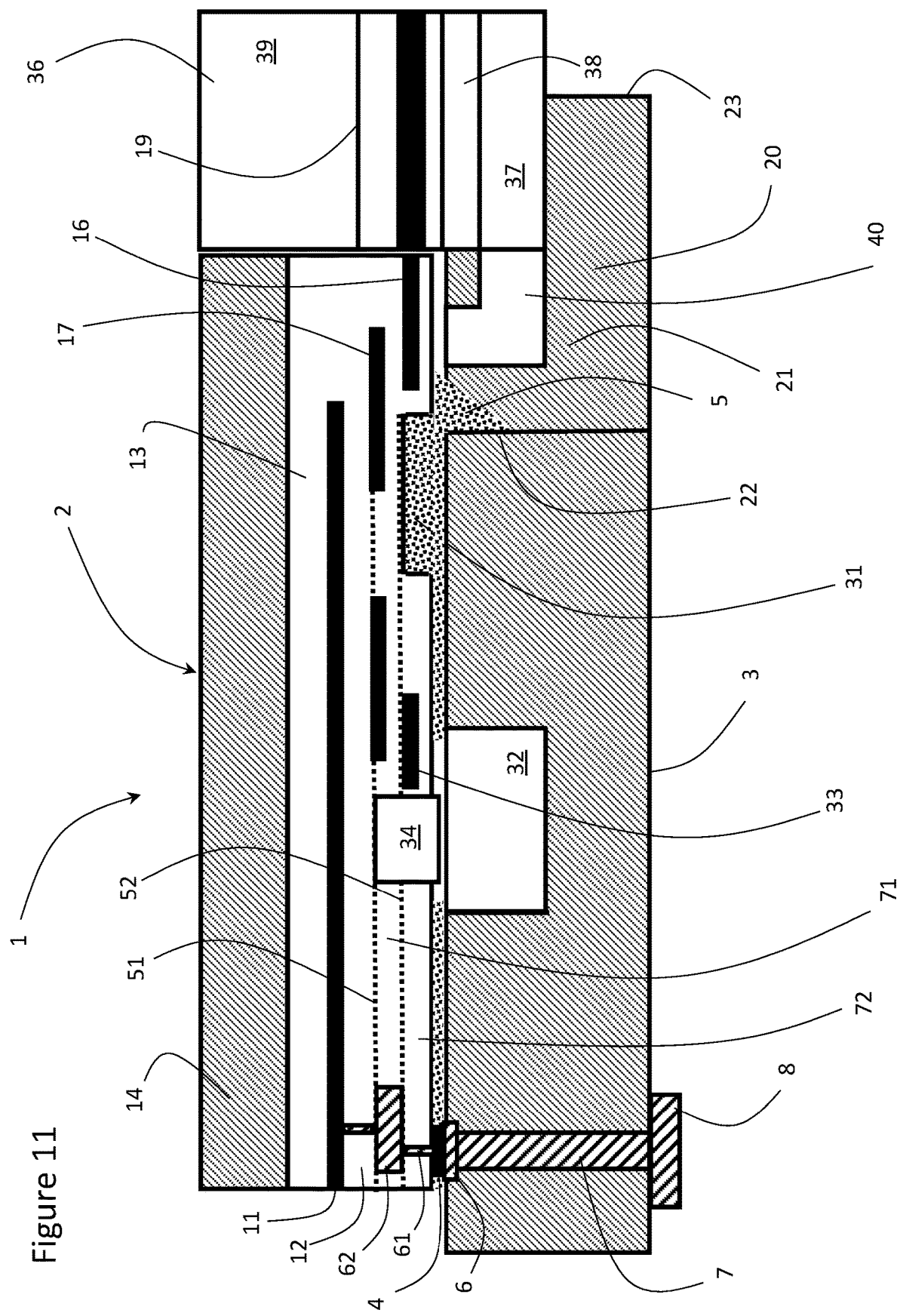
FIG. 11 is a cross-section view of the apparatus of FIG. 10.

Typically, an optical fiber 19 has an end thereof facing the edge of the PIC chip 2 such that the core of the optical fiber 19 is approximately aligned with the optical waveguide core of the edge coupler 16 to form an optical interface for optical coupling of light therebetween. Optical edge coupling to another form of external optical waveguide is also possible. The optical waveguide 19 may be a bare fiber (FIG. 2) or may be part of an assembly, such as a fiber connector 35 (FIGS. 5 and 6) or a fiber array 36 (FIG. 11). The fiber array 36 may include a substrate 37 with mechanical features, e.g. v-grooves 38, holding multiple fibers, a lid 39 to hold the fibers to the substrate 37, and epoxy to hold the fiber array 36 assembly together. A mechanical connector 40 may also be provided on the fiber connector 35 or the fiber array 36 for mechanically coupling to the PIC chip 2. Any of the aforementioned arrangements for the external optical waveguide 19, e.g. fiber connector 35 or fiber array 36, may be provided on any of the embodiments herein described. The external optical waveguide 19 may also comprise some other integrated waveguide or even a light source.

Typically, it is desirable to prevent the adhesive 5 from entering the optical interface during fabrication, e.g. from entering the part of the edge of the chip adjacent the edge coupler 16. A presence of the solidified adhesive 5 on this part of the edge of the PIC chip 2 can reduce the quality of the optical coupling between the edge coupler 16 and the adjacent end face of the optical fiber 19. For these reasons, the electrical substrate 3 includes a cavity 20, which is located below a portion of the edge coupler 16, e.g. the part of the edge of the PIC chip 2 facing the nearby end of the optical fiber 19. The cavity 20 may also extend under the edge of the PIC chip 2 forming an undercut section 21 under part of the edge of the PIC chip 2.

During fabrication, excess liquid adhesive 5 between the PIC chip 2 and the electrical substrate 3 may fall into the cavity 20 rather than flowing to the part of the edge of the PIC chip facing the adjacent end face of the optical fiber 19. Accordingly, most of the underfill material 5 that flows from between the PIC chip 2 and the electrical substrate 3 may not flow into the cavity 20, due to the larger gap impeding the capillary action of the underfill material 5. Most of the underfill material 5 is, thus, stopped before reaching the optical interface between the external optical waveguide 19 and the edge coupler 16 forming a region under the PIC chip 2 free of the adhesive 5; however, at least a part of meniscus of the adhesive may be inside the cavity 20. For example, the cavity 20 may extend 0.5 mm to 1 mm on either side of the edge coupler 16, about 0.5 mm to 4 mm deep, preferably about 1 mm to 3 mm deep, and about 0.5 mm to 1 mm, back from the edge of the PIC chip 2, which faces the adjacent end face of the optical fiber 19 after fabrication and connection to the optical fiber 19.

Figure 4:
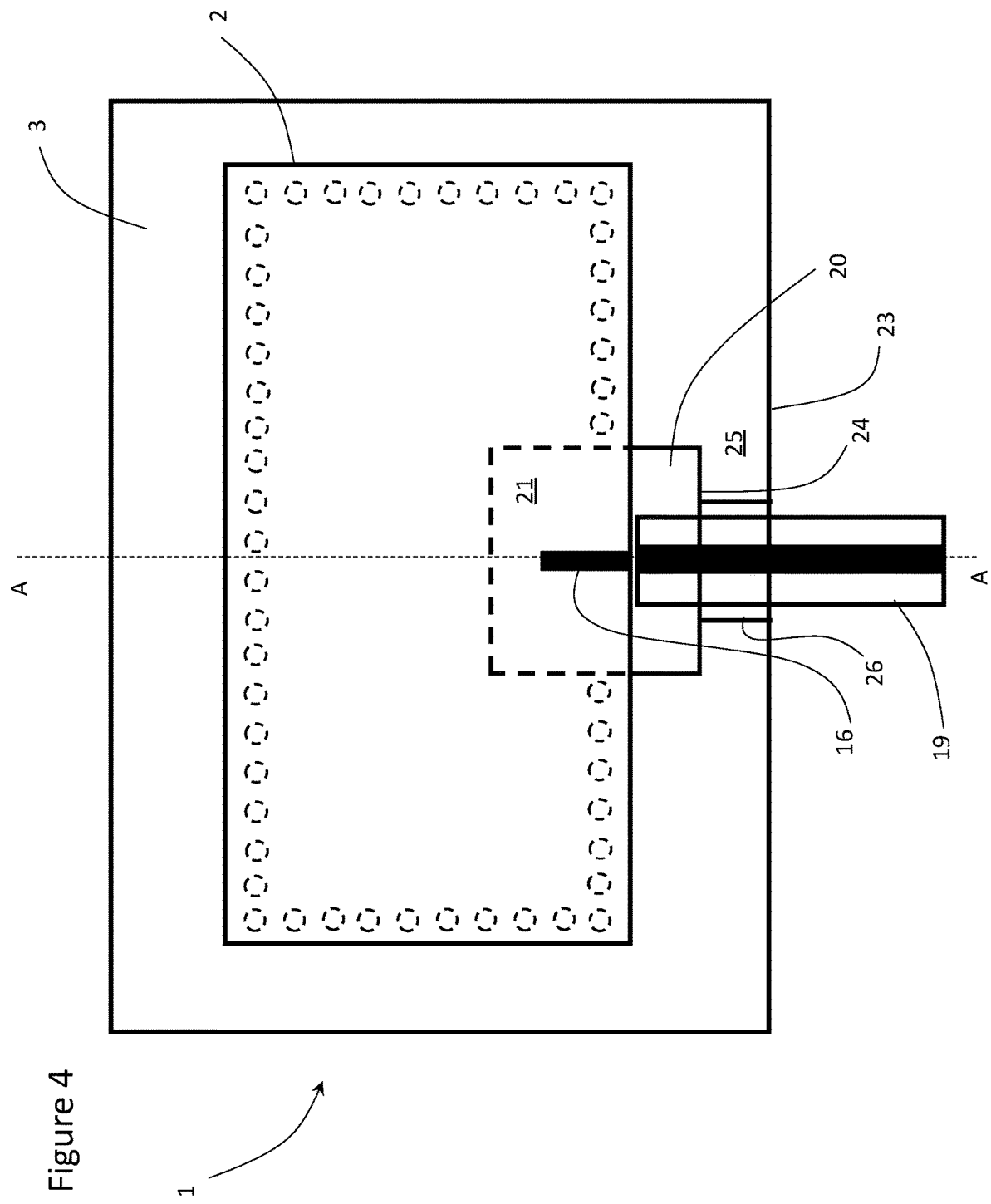
FIG. 4 is a top view of a photonic integrated circuit apparatus according to another example embodiment of the present disclosure.
Figure 5:
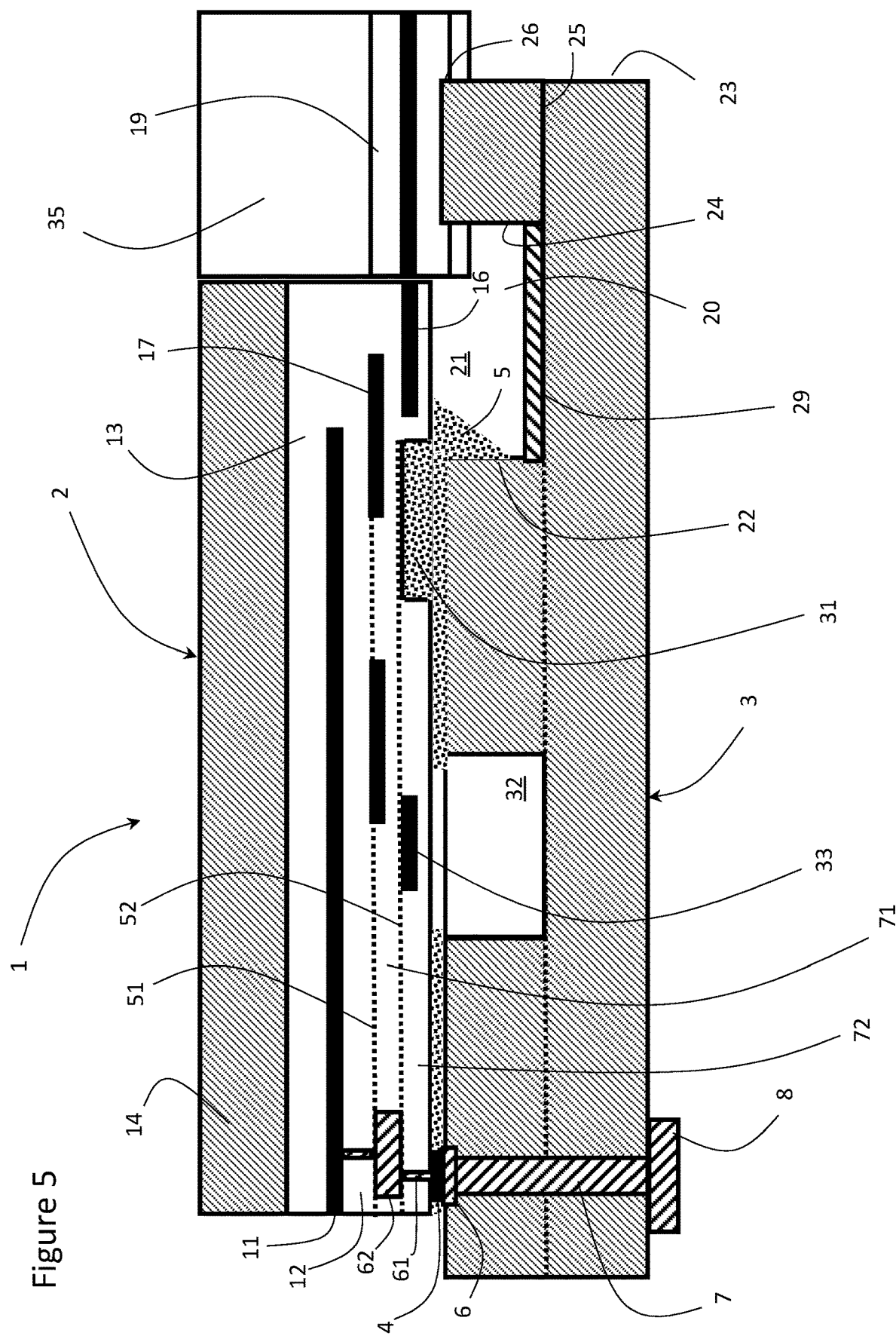
FIG. 5 is a cross-sectional view of the apparatus of FIG. 4.

The cavity 20 may extend from an inner, e.g. vertical, wall 22 to an outer edge 23 of the electrical substrate 3, as in FIGS. 1-3 or the cavity 20 may extend from the inner wall 22 to an outer, e.g. vertical, wall 24 spaced apart from the outer edge 23, in between the inner wall 22 and the outer edge 23 of the electrical substrate 3, as in FIGS. 4 and 5. The remaining section of the electrical substrate 3, between the outer wall 24 and the outer edge 23, may be configured into a fiber supporting section 25 for supporting an end of the optical fiber 19, the fiber connector 35 or the fiber array 36.

Figure 6:
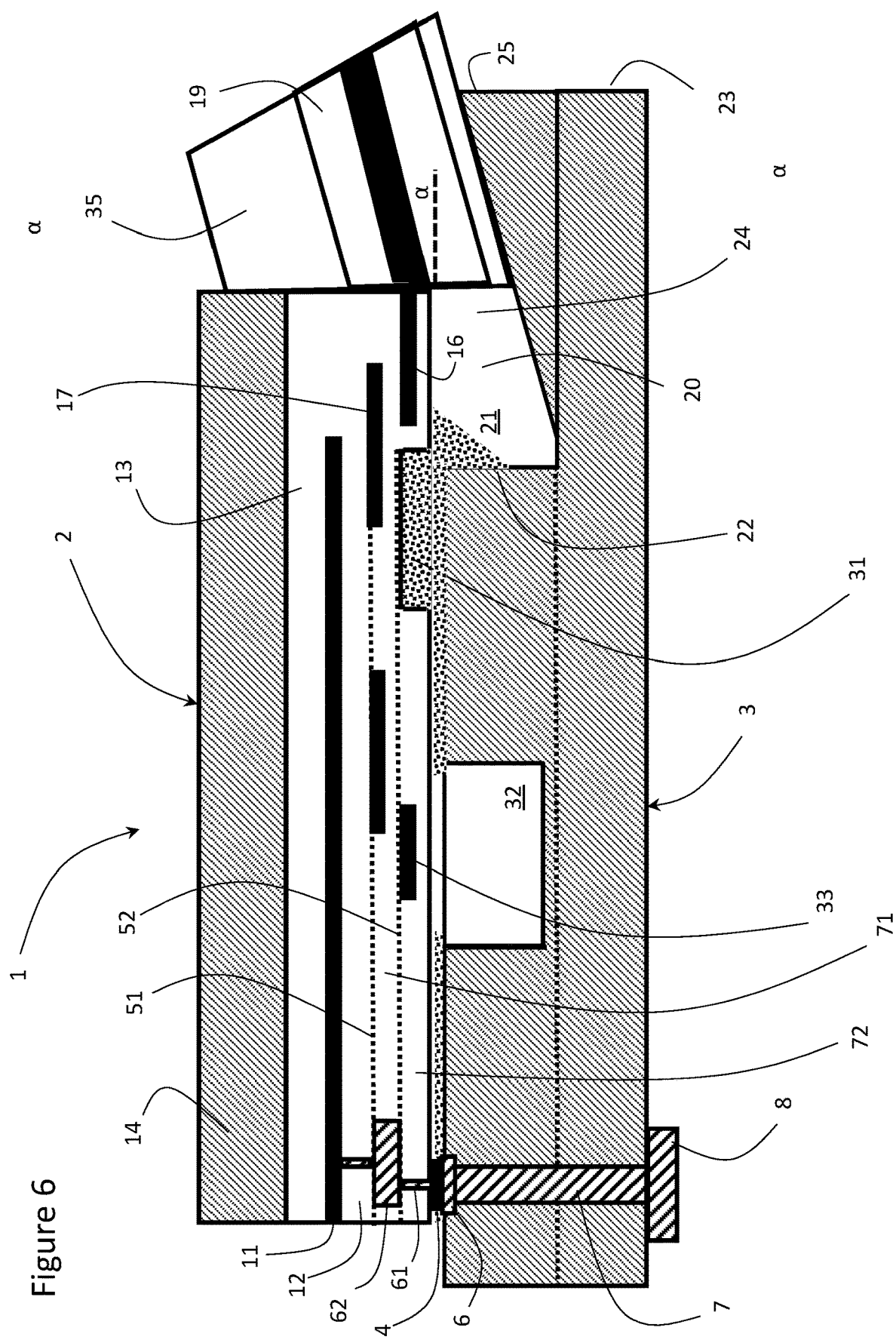
FIG. 6 is a cross-sectional view of a photonic integrated circuit apparatus according to another embodiment of the present disclosure.

With reference to FIG. 6, the fiber supporting section 25 may also include an angled outer wall 24, whereby the optical fiber 19, e.g. an angle cut optical fiber, may be mounted at an acute angle α relative to the longitudinal axis of the edge coupler 16, e.g. using the fiber connector 35 or the fiber array 36.

Figure 7:
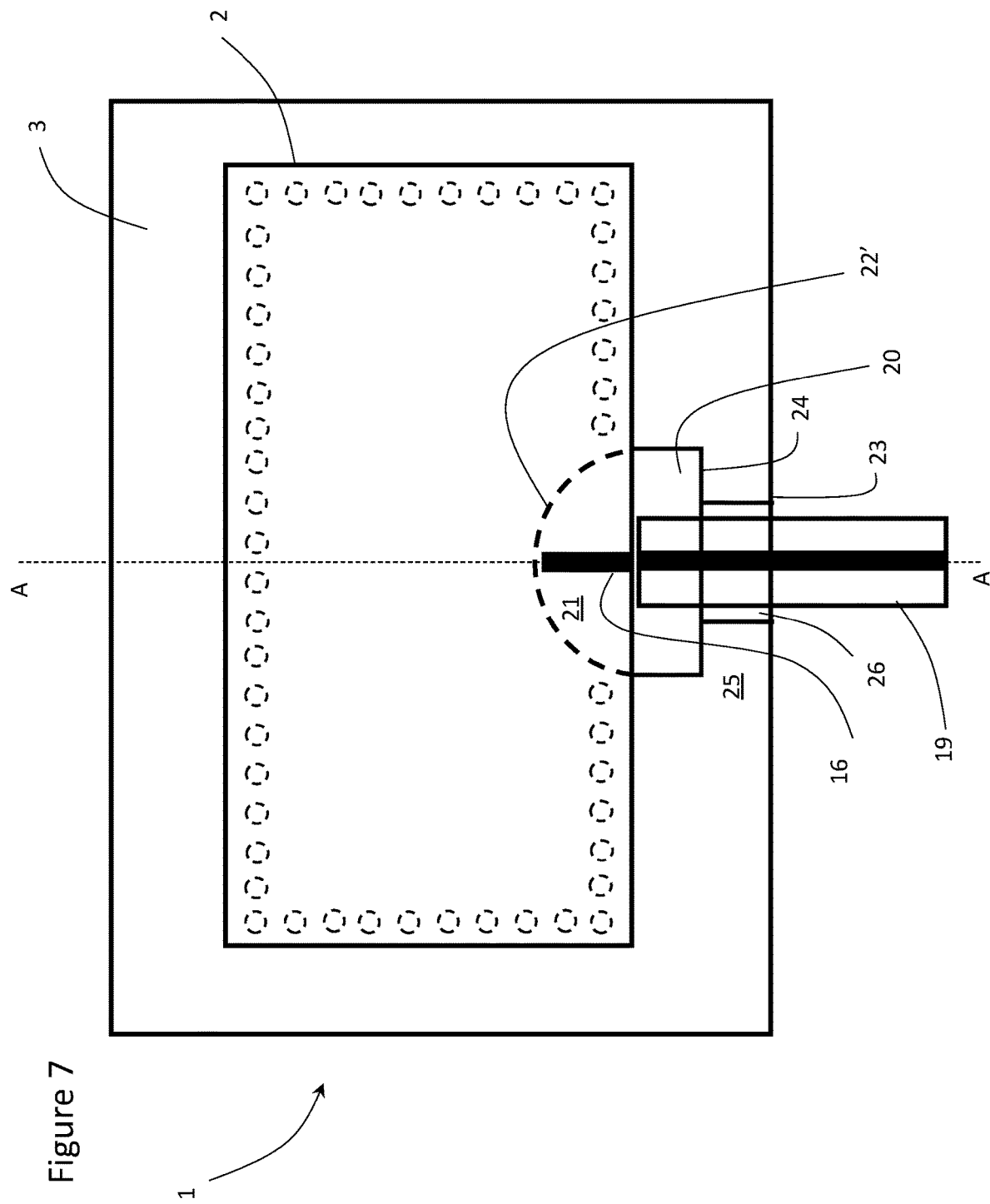
FIG. 7 is a top view of a photonic integrated circuit apparatus according to another embodiment of the present disclosure.
Figure 8:
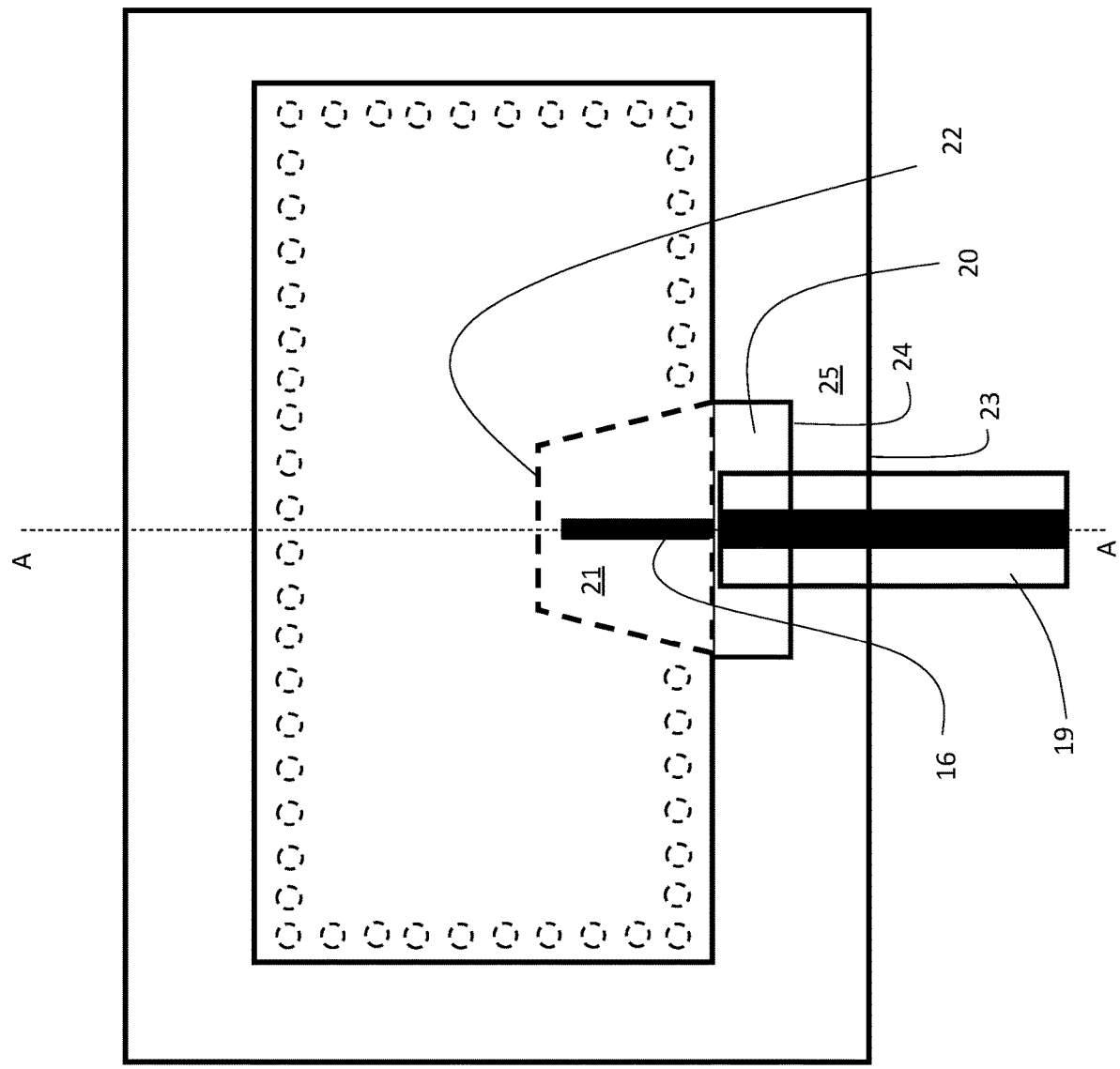
FIG. 8 is a top view of a photonic integrated circuit apparatus according to another embodiment of the present disclosure.
Figure 9:
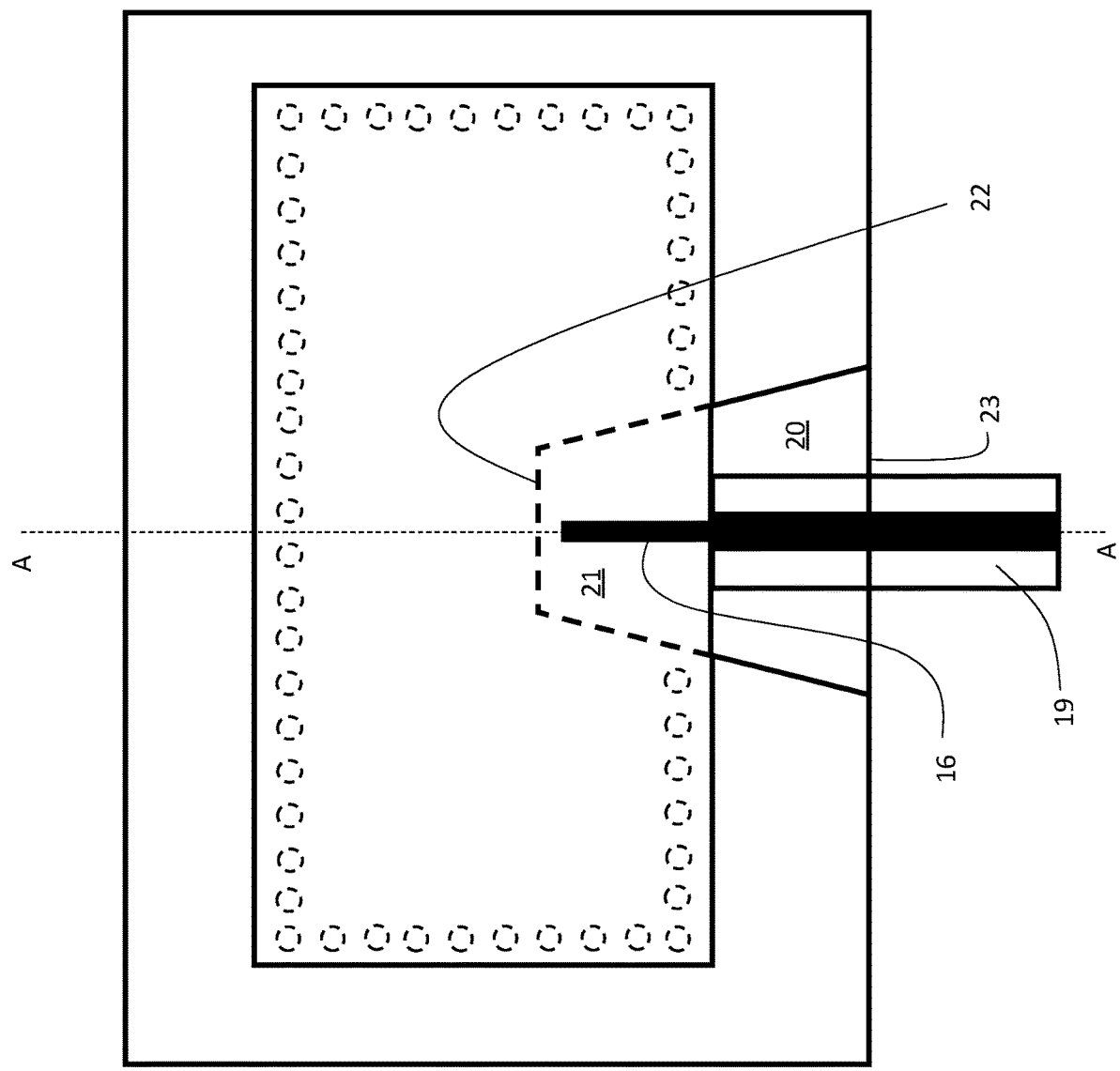
FIG. 9 is a top view of a photonic integrated circuit apparatus according to another embodiment of the present disclosure.

With reference to FIGS. 7-9, the cavity 20, in particular the undercut section 21, may have a non-rectangular shape. For example, with reference to FIG. 7, the inner wall 22' may comprise a curved, e.g. semicircular, section to minimize the amount of material that has to be removed from the electrical substrate 3. Similarly, with reference to FIGS. 8 and 9, the side walls the cavity 20 (FIG. 9) or of just the undercut section 21 (FIG. 8) may be tapering in from the outer wall 24 to the inner wall 22. As above, in any of the embodiments, the cavity 20 may extend to the edge 23 of the PIC chip 2 or to the outer wall 24 and include a fiber supporting section 25.

Figure 10:
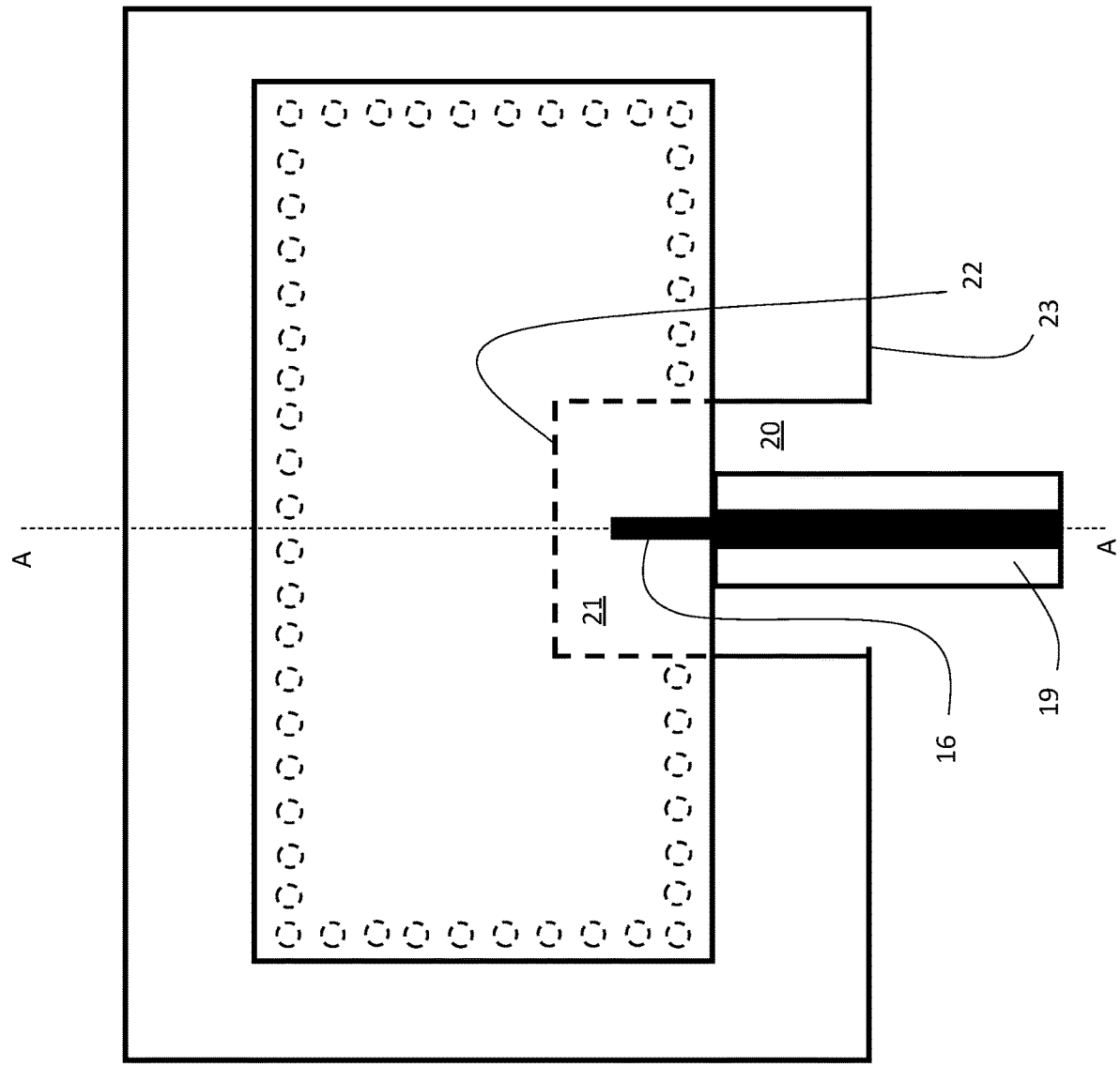
FIG. 10 is a top view of a photonic integrated circuit apparatus according to another embodiment of the present disclosure.

The cavity 20 may extend from the upper surface of the electrical substrate 3 partially through to the lower surface of the electrical substrate 3 or, as illustrated in FIGS. 10 and 11, completely through to the lower surface of the electrical substrate 3.

In any of the aforementioned embodiments, the PIC chip 2 may also include one or more collection pits 31 in an outer major surface thereof opening onto the upper surface of the electrical substrate 3 and the layer of underfill adhesive material 5 providing an additional location for impeding the capillary action of the underfill adhesive material 5 and/or for underfill adhesive material 5 to collect other than at the part of the edge of the PIC chip 2 facing an adjacent end face of the optical fiber 19, e.g. the optical interface between the optical fiber 19 and the edge coupler 16. Similarly, one or more centrally located cavities 32 may be provided in the electrical substrate 3 extending inwardly from an upper surface thereof, proximate to the center of the outer surface of the PIC chip 2 to stop flow of liquid adhesive to optical, electrical or thermal structures, e.g. optical coupler 33 and component 34 (FIG. 12), internal to the PIC chip 2. The collection pits 31 may be defined by the first etch stop layer 51 and/or the second etch stop layer 52 or other additional etch stop layers found in the PIC chip 2.

Figure 12:
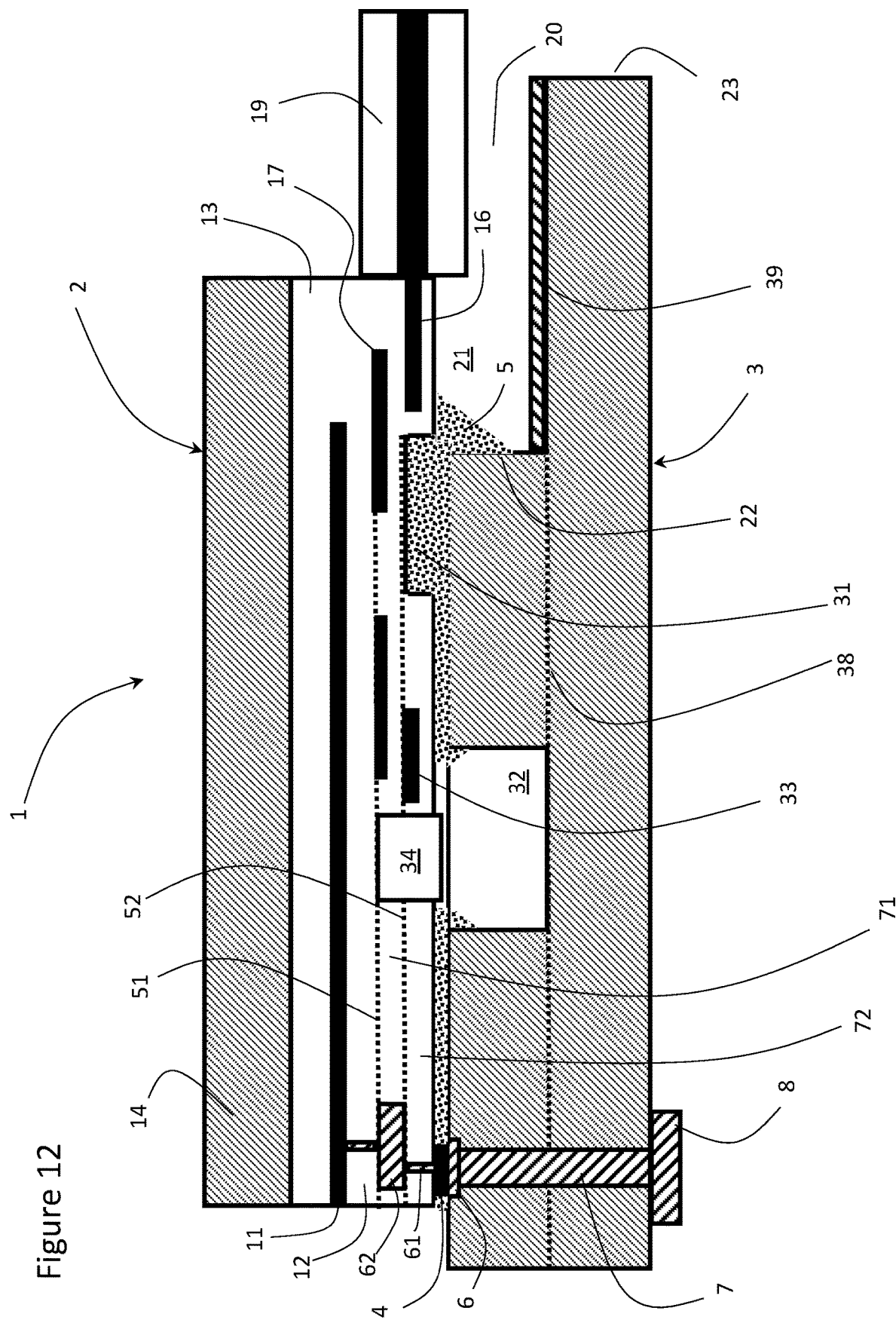
FIG. 12 is a cross-sectional view of a photonic integrated circuit apparatus according to another example embodiment of the present disclosure.

With reference to FIG. 12, some embodiments of the PIC chip 2 may alternatively or also include one or more optical and/or electrical components 34 integrated into a recess extending from an outer surface of the PIC chip 2. One of the components 34 may comprise a light source, e.g. laser, for generating a beam of light. Accordingly, the PIC chip 2 may also include an optical modulator in the optical device layer 11. The beam of light may be generated in the component 34, e.g. the light source, modulated by the modulator, and then output the optical waveguide 19. To impede the capillary action of the underfill adhesive material 5 and/or to collect the underfill adhesive material 5, the centrally located cavity 32 is provided to prevent the underfill adhesive material 5 from entering or interfering with the optical interface between the component 34, e.g. the light source, and the optical coupler 33. The component 34 may not even extend far enough from the outer surface of the PIC chip 2 to enter into the centrally located cavity 32, whereby the centrally located cavity 32 may only be provided to impede the flow of underfill adhesive material 5. The centrally located cavity 32 may be totally enclosed within the electrical substrate 3 with only an opening in the upper surface under the PIC chip 2 or a channel may be provided to an edge of the electrical substrate 3 to provide access thereto. Typically, the central cavity 32 extends about 0.5 mm to 1 mm on either side of the interface between the component 34 and the optical coupler 33, and about 100 μm to 5 mm deep, preferably about 0.5 mm to 4 mm deep, and preferably about 1 mm to 3 mm deep.

With reference to FIG. 12, in some of the embodiments, the one or more components 34 may alternatively or also include a thermal optical phase tuner or shifter for adjusting the phase of light travelling in the PIC chip 2, e.g. in the optical device layer 11. Accordingly, the central cavity 32 may be provided to prevent the underfill adhesive material 5 from entering or interfering with the thermal interface between thermal phase tuner and one of the optical waveguides in the PIC chip 2, e.g. the optical device layer 11.

Figure 13:
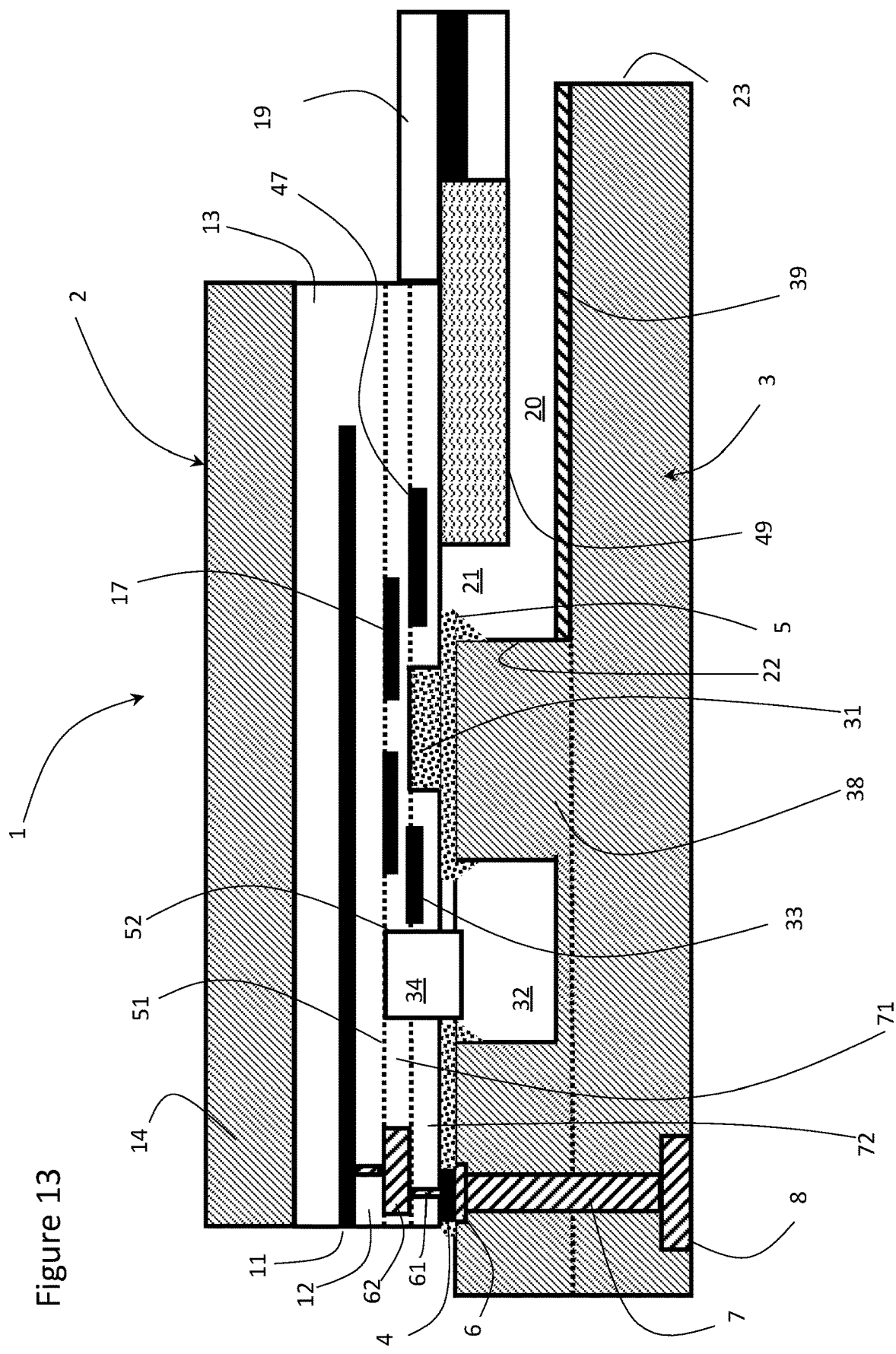
FIG. 13 is a cross-sectional view of a photonic integrated circuit apparatus according to another example embodiment of the present disclosure.

With reference to FIG. 13, instead of an edge optical coupler 16, some embodiments may include an integrated evanescent optical coupler 47 for optical coupling with the external optical waveguide 19 via an external evanescent optical coupler 49. The integrated evanescent optical coupler 47 may be provided proximate to the outer surface of the PIC chip 2 in a more centrally located position, spaced from the edge of the PIC chip 2. To impede the capillary action of the underfill adhesive material 5 and/or to collect the underfill material 5, the cavity 20 is provided to prevent the underfill adhesive material 5 from entering or interfering with the optical interface between the integrated evanescent optical coupler 47 and the external evanescent optical coupler 49.

The cavity 20, the collection pit 31 and the central cavity may be formed by any combination of mechanical milling, chemical etching or laser drilling. In particular for chemical etching processes, an etch stop layer 38 may be provided in the electrical substrate 3 to define the depth at which the cavity 20 and/or the central cavity 32 may extend to prevent the cavity 20 from being too deep, e.g. if there are critical structures in the electrical substrate 3 under the cavity 20. The bottom surface of the cavity 20 may be plated with metal layer 29 for protection, e.g. to protect the etch stop layer 38. The depth of the cavity 20 may be configured to enable larger optical coupling structures, e.g. multi-fiber couplers, access to the edge coupler 16 of the PIC chip 2.

With reference to FIGS. 14A to 14J, a method of manufacturing the PIC chip 2 includes an initial step (FIG. 14A) of providing the substrate 14 with the lower cladding layer 12, e.g. $SiO_2$, and a first layer of waveguide core material 41, e.g. silicon, such as an SOI wafer structure. The first layer of waveguide core material 41 may be patterned and etched down to define the optical components according to the requirements of the optical device layer 11 (FIG. 124B).

Then a cladding layer, e.g. SiO$_2$, may be deposited over and around the optical device layer 11 (FIG. 124C) filling in the etched away portions of the optical device layer 11 and forming the upper cladding layer 13. A first etch stop layer 51, e.g. silicon nitride, may be provided on the upper cladding layer 13.

Figure 14A:
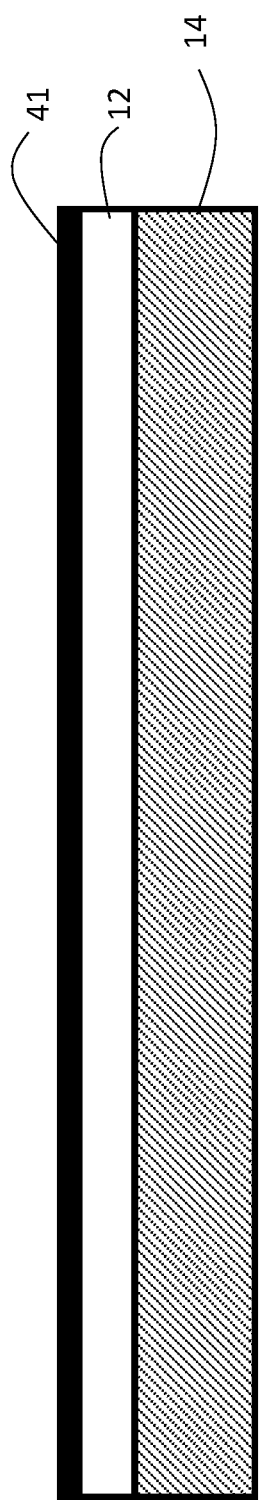
FIGS. 14A to 14J are cross-sectional views illustrating an example of a method of manufacturing the photonic integrated circuit chip in accordance with any of the aforementioned embodiments.
Figure 14B:
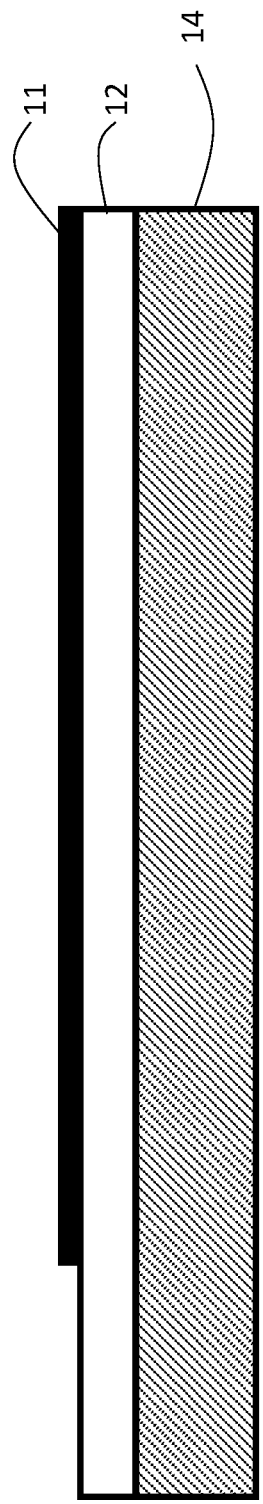
Figure 14C:
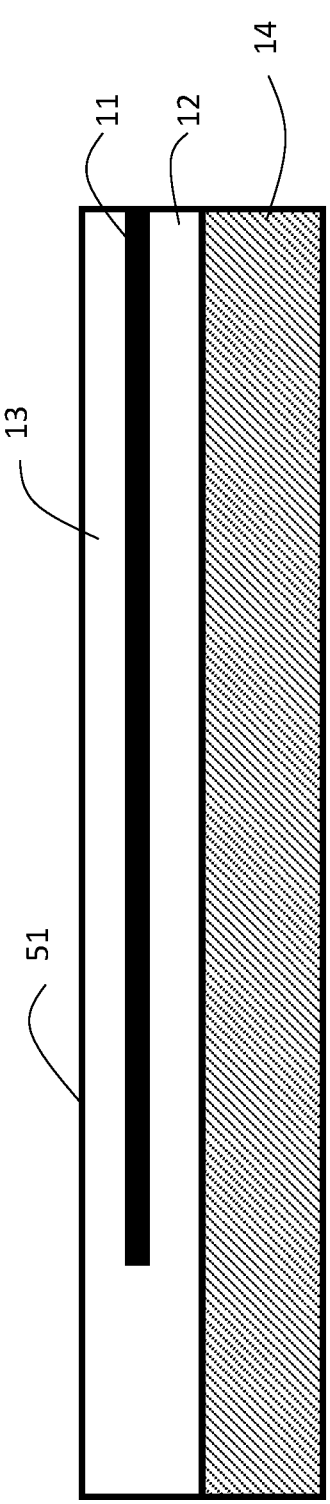
Figure 14D:
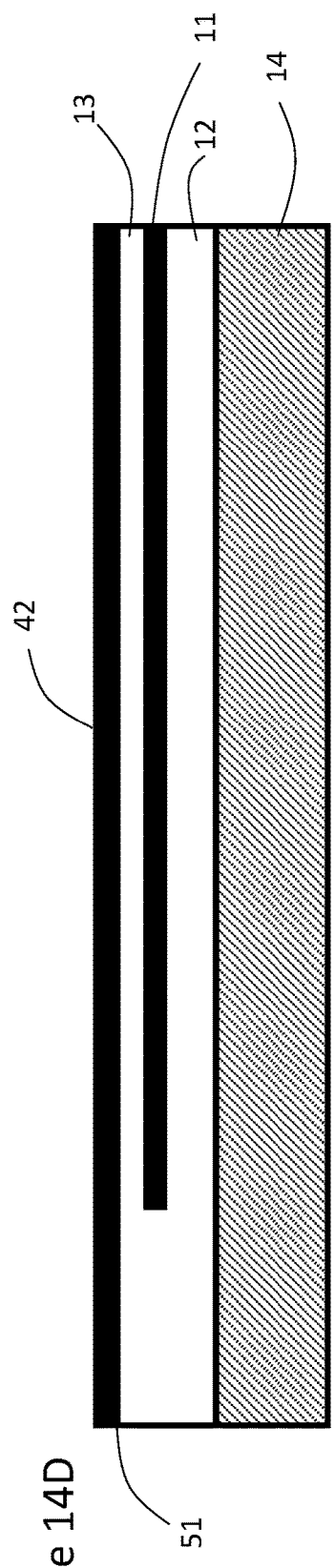
Figure 14E:
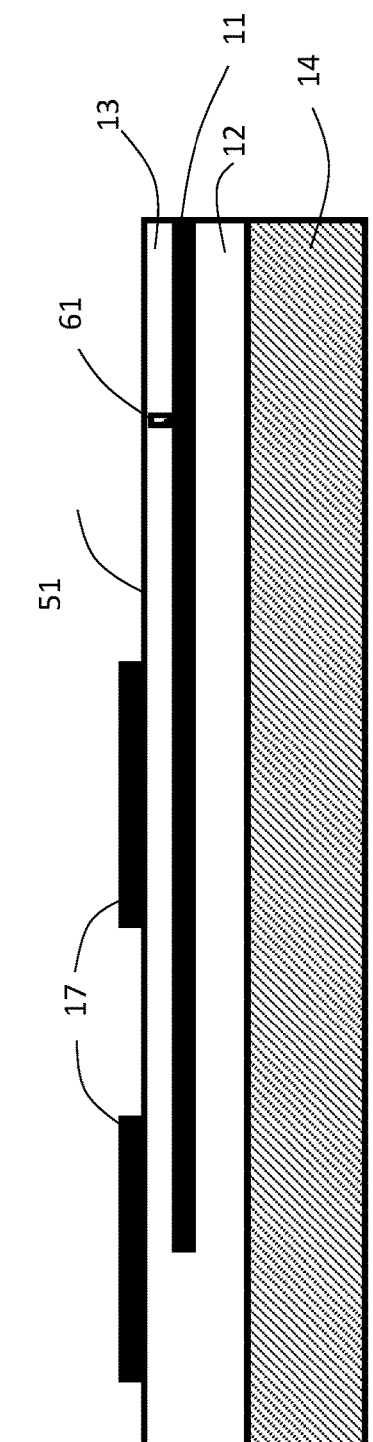
Figure 14F:
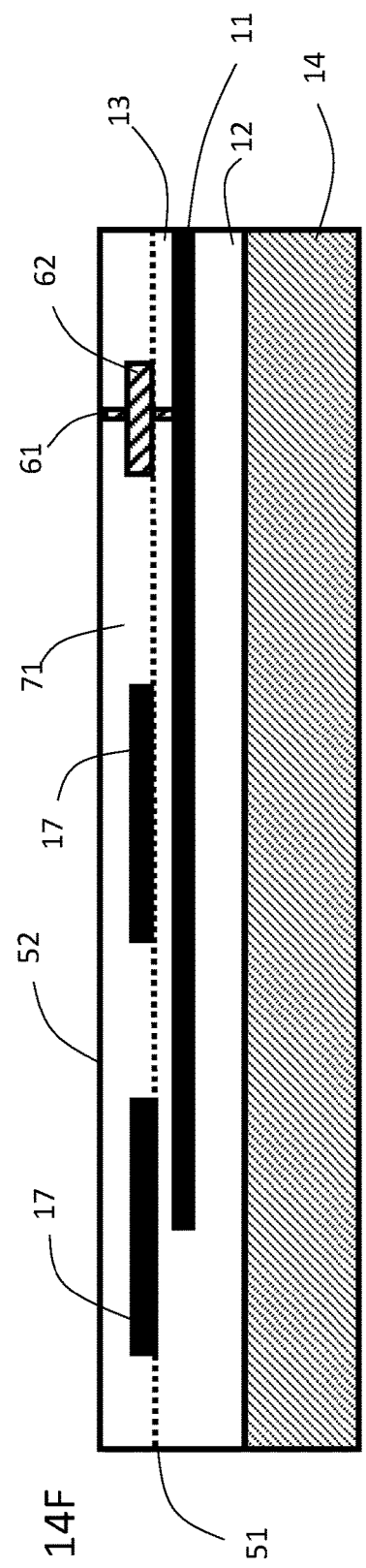

When the vertical coupler 17 is required, a second waveguide core material layer 42, e.g. silicon or silicon nitride, may deposited over the upper cladding layer 13 (FIG. 14D), and the second waveguide core material layer 42 may be patterned to define and etched to form the vertical coupler 17 (FIG. 14E). Alternatively, the first etch stop layer 51, e.g. SiN, may be patterned to define and etched to form the vertical coupler 17, when the first etch stop layer 51 comprises a waveguide core material, e.g. with an index of refraction higher than the surrounding upper cladding layer 13. The upper cladding layer 13 may also undergo an etching step to define and form electrical vias 61 for transmitting electrical signals to and from the optical device layer 11, as part of a damascene process. First additional layers of cladding 71, e.g. oxide, may then be deposited over and around the vertical coupler 17, and patterned and etched, e.g. down to the first etch stop layer 42, to define and form conductive metal layers 62 and additional conductive metal vias 61 therethrough, as required (FIG. 14F). A second etch stop layer 52, e.g. silicon nitride, may be provided on the first additional layers of cladding layer 71.

Figure 14G:
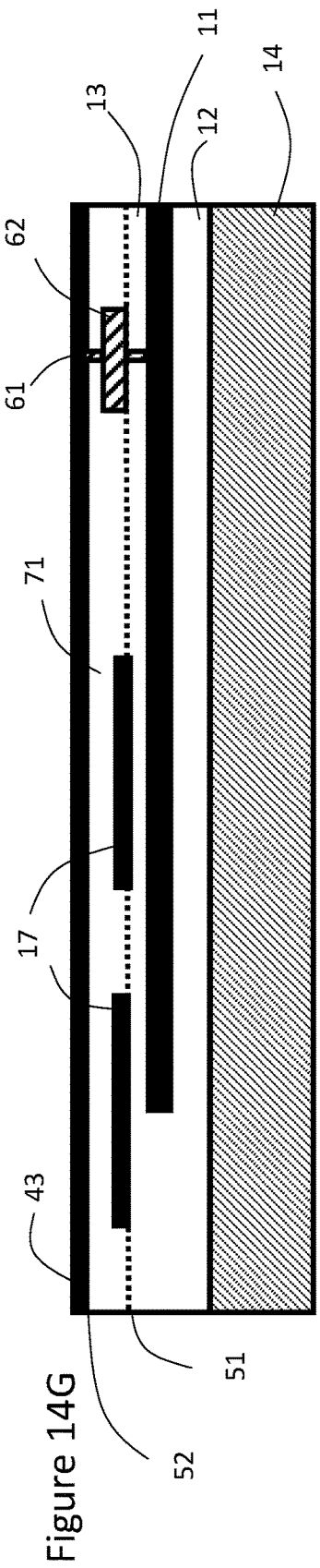
Figure 14H:
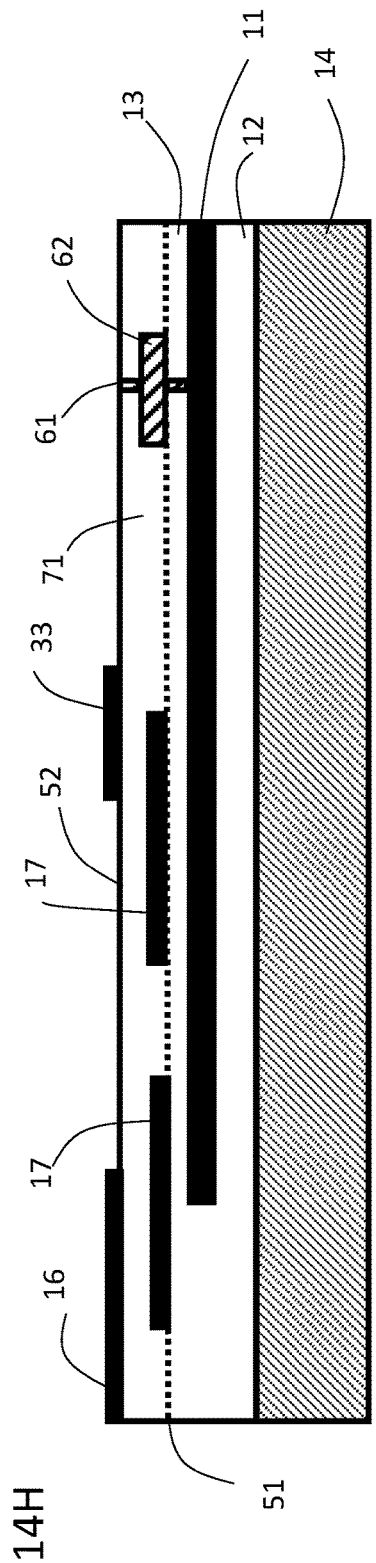
Figure 14I:
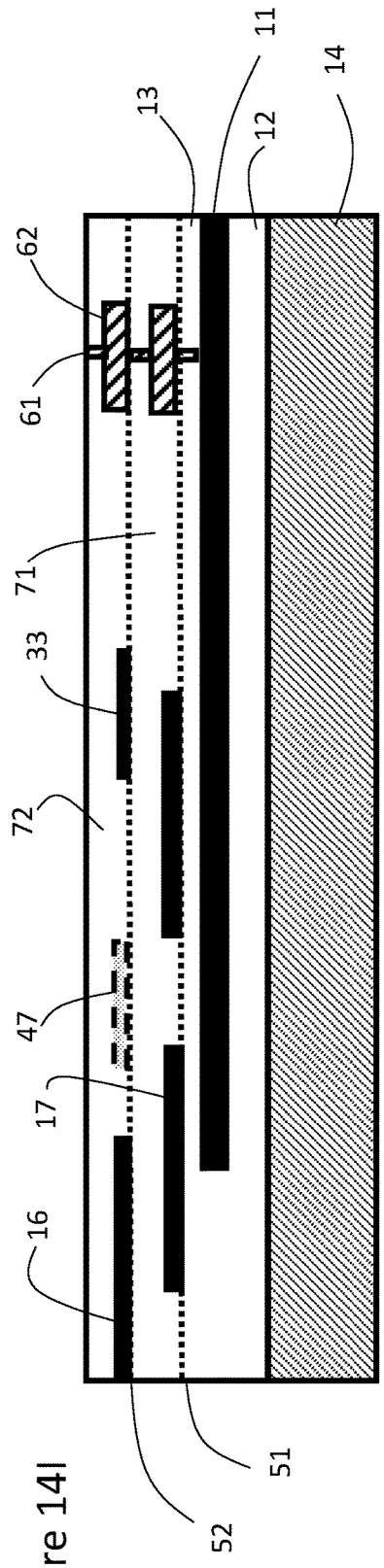

When the edge coupler 16 and/or the integrated evanescent coupler 47 is provided in a layer separate from the device layer 11, a third waveguide core material layer 43 may be deposited over the first additional layers of cladding 71 and the second etch stop layer 52 (FIG. 14G). Then the third waveguide core material layer 43 is patterned to define and etched to form the edge coupler 16 (FIG. 14H). Second additional layers of cladding 72, e.g. oxide, may then be deposited over and around the edge coupler 16, and patterned and etched, e.g. down to the second etch stop layer 52, to define and form conductive metal layers 62 and additional conductive metal vias 61 therethrough, as required (FIG. 14I). Alternatively, the second etch stop layer 52, e.g. SiN, may be patterned to define and etched to form the edge coupler 16, when the second etch stop layer 52 is comprised of a waveguide core material, e.g. with an index of refraction higher than the surrounding first additional cladding layer 71.

Figure 14J:
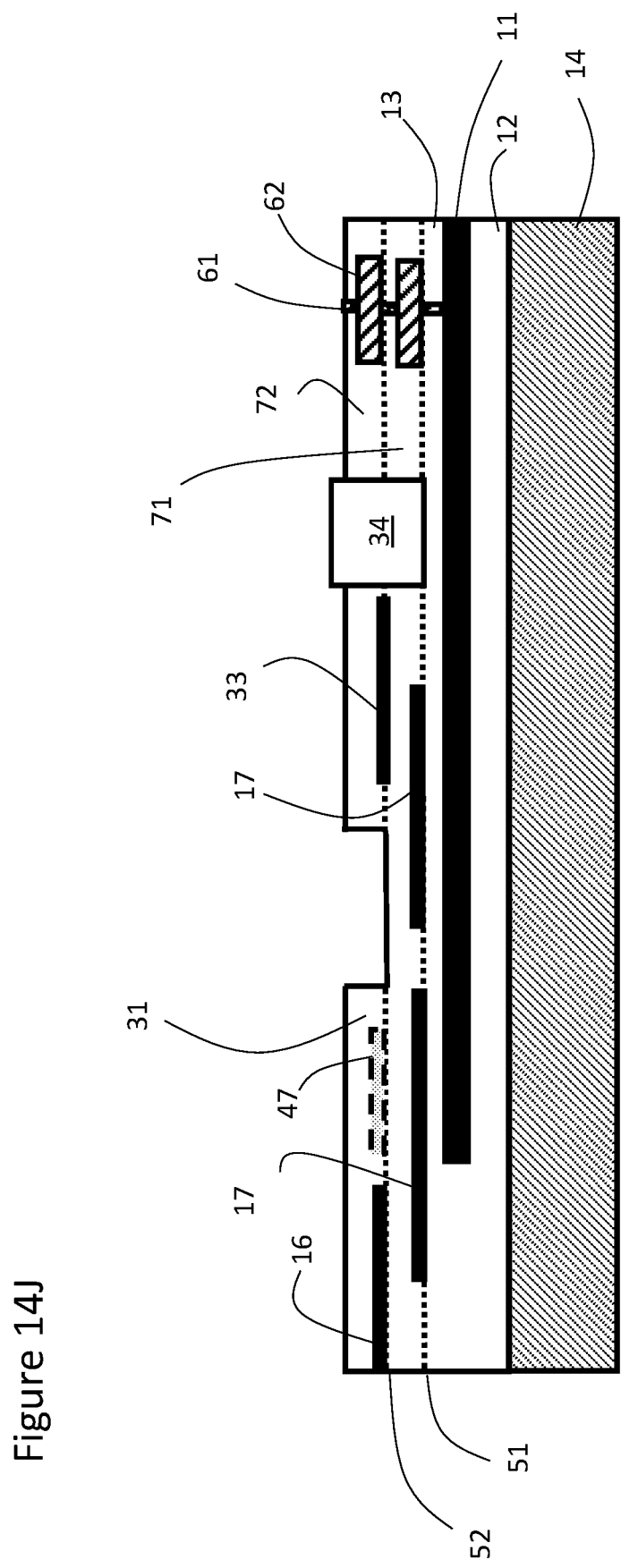

With reference to FIG. 14J, when one or more of the collection pits 31 are provided, additional patterning and etching steps may be carried out in which the collection pit 31 are patterned to define and etched to form. The one or more optical and/or electrical components 34, e.g. the light source, may then be integrated into recesses etched into and extending from the outer (upper) surface of the PIC chip 2 The one or more of the first etch stop layer 51 and the second etch stop layer 52 may be used to define the depth of the collection pits 31

The photonic integrated circuit (PIC) chip 2 may then be mounted on the electrical substrate 3, by assembly processes, such as flip-chip bonding, while aligning the one or more of electrical contacts 6 on the electrical substrate 3 with the electrical contacts, e.g. conductive metal layers 62 and additional conductive metal vias 61, on the PIC chip 2 via solder bumps 4. Underfill adhesive material 5 may be placed on the electrical substrate 3 prior to assembly or may be injected between the electrical substrate 3 and the PIC chip 2 after assembly. Finally, the optical waveguide 19, e.g. optical fiber, the fiber connector 35, the optical fiber array 36 or the evanescent coupler 49, may be attached to the PIC chip 2, aligned and optically coupled with the edge coupler 16 or the integrated evanescent coupler 47.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:
1. An apparatus comprising:
    a photonic integrated circuit (PIC) chip including an optical device layer and an edge coupler for optically coupling the PIC chip to an adjacent end of an optical fiber, via an edge of the PIC chip;
    an electrical substrate configured to support the PIC chip over a substantially planar surface of the electrical substrate; and
    a layer of adhesive binding the PIC chip to the substantially planar surface of the electrical substrate;
    wherein the substantially planar surface of the electrical substrate includes a surface of a cavity, the cavity being at least, partially located between the edge coupler and the electrical substrate.
2. The apparatus of claim 1, wherein the cavity is partially filled with the adhesive and has a region under the PIC chip free of the adhesive.
3. The apparatus of claim 1, wherein at least a part of meniscus of the adhesive is inside the cavity.
4. The apparatus of claim 1, wherein the PIC chip has an outer planar surface facing the cavity, and wherein a portion of said outer planar surface adjacent the edge is free of the adhesive.
5. The apparatus of claim 1, further comprising the optical fiber.
6. The apparatus according to claim 1, wherein the cavity, at least, extends under the edge of the PIC chip.
7. The apparatus of claim 6, wherein the cavity is partially filled with the adhesive and has a region under the PIC chip free of the adhesive.
8. The apparatus of claim 6, wherein at least a part of meniscus of the adhesive is inside the cavity.
9. The apparatus of claim 6, wherein the PIC chip has an outer planar surface facing the cavity and a portion of said outer planar surface adjacent the edge is free of the adhesive.
10. The apparatus of claim 6, further comprising the optical fiber.
11. The apparatus of claim 1, wherein the cavity extends through the electrical substrate.
12. The apparatus of claim 1, wherein the PIC chip includes a pit in an outer major surface thereof, some of the adhesive being in the pit.
13. The apparatus of claim 1, wherein the cavity extends from an inner wall under the PIC chip to an outer edge of the electrical substrate.
14. The apparatus of claim 1, wherein the PIC chip includes a component extending to an outer surface thereof; and
    wherein the electrical substrate also includes an additional cavity under the component.
15. The apparatus of claim 14, further comprising an optical coupler configured to couple light between the component and the device layer; wherein the additional cavity is under an interface between the component and the device layer.

16. The apparatus of claim 14, wherein the component comprises a light source.

17. The apparatus of claim 14, wherein the component comprises a thermal phase tuner.

18. The apparatus of claim 1, wherein the cavity extends from an inner wall under the PIC chip to an outer wall spaced from an outer edge of the electrical substrate.

19. The apparatus of claim 18, wherein the outer wall is configured at an acute angle to a longitudinal axis of the edge coupler for aligning the optical fiber at the acute angle relative to the edge coupler.

20. The apparatus according to claim 18, wherein the electrical substrate includes a fiber supporting section in between the outer wall and the outer edge of the electrical substrate.

* * * * *